United States Patent
Lindberg et al.

(10) Patent No.: US 10,809,869 B2
(45) Date of Patent: Oct. 20, 2020

(54) LAYERED IMAGE COMPRESSION

(71) Applicant: Apple Inc., Cupertino, CA (US)

(72) Inventors: Lars M. Lindberg, Bjaerred (SE); Paul S. Chang, San Jose, CA (US); Ali Sazegari, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 171 days.

(21) Appl. No.: 15/700,113

(22) Filed: Sep. 9, 2017

(65) Prior Publication Data

US 2019/0079639 A1 Mar. 14, 2019

(51) Int. Cl.
| | |
|---|---|
| *G06F 3/0481* | (2013.01) |
| *H04N 19/17* | (2014.01) |
| *H04L 29/06* | (2006.01) |
| *H04N 19/167* | (2014.01) |
| *H04N 19/117* | (2014.01) |
| *H04N 19/23* | (2014.01) |
| *H04N 19/174* | (2014.01) |

(52) U.S. Cl.
CPC ............ *G06F 3/0481* (2013.01); *H04L 69/04* (2013.01); *H04N 19/117* (2014.11); *H04N 19/167* (2014.11); *H04N 19/17* (2014.11); *H04N 19/174* (2014.11); *H04N 19/23* (2014.11)

(58) Field of Classification Search
None
See application file for complete search history.

(56) References Cited

U.S. PATENT DOCUMENTS

| | | | |
|---|---|---|---|
| 6,894,704 B1 * | 5/2005 | Bourdev | G06T 11/40 345/629 |
| 7,716,344 B2 | 5/2010 | Salesky et al. | |
| 7,805,024 B2 | 9/2010 | Wu | |
| 8,160,149 B2 | 4/2012 | Demos | |
| 2002/0186387 A1 * | 12/2002 | Moroney | G06T 5/20 358/1.9 |
| 2007/0097421 A1 * | 5/2007 | Sorensen | G06F 16/58 358/1.15 |
| 2007/0279494 A1 * | 12/2007 | Aman | G01S 3/7864 348/169 |
| 2009/0110305 A1 * | 4/2009 | Fenney | G06T 9/005 382/232 |
| 2013/0052430 A1 * | 2/2013 | Spiro | B44F 1/10 428/195.1 |
| 2015/0022921 A1 | 1/2015 | Vinson | |
| 2018/0211444 A1 * | 7/2018 | Shaviv | G06T 19/006 |

* cited by examiner

*Primary Examiner* — Cesar B Paula
*Assistant Examiner* — John M Heffington
(74) *Attorney, Agent, or Firm* — Dickinson Wright RLLP (57) ABSTRACT

Disclosed are techniques for pre-processing layered images prior to compression and distribution. According to some embodiments, a technique can include accessing at least two images of a layered image: (i) a background image, and (ii) one or more layer images. Next, a flattened image is generated based on the at least two images. Next, respective one or more delta layer images are generated for the one or more layer images by: for at least one pixel of each layer image having (i) an alpha sub-pixel set to fully opaque, and (ii) a first color property equivalent to a second color property of a corresponding pixel within the flattened image: setting bits of the first color property of the pixel to the same value (e.g., zero (0) or one (1)). Finally, the one or more delta layer images are compressed and provided to a destination computing device.

20 Claims, 8 Drawing Sheets

FIG. 1

Step 210 – Generate a flattened image of a layered image that includes (1) a background image, and (2) one or more layer images.

FIG. 2A

Step 220 – Generate respective one or more delta layer images for the one or more layer images by:

For at least one pixel of each layer image having (1) an alpha sub-pixel set to fully opaque, and (2) a first color property equivalent to a second color of a corresponding pixel within the flattened image:

Setting bits of the first color property of the pixel to the same value.

*FIG. 2B*

Step 230 – Separate the alpha sub-pixels of each delta layer image into a respective alpha data stream.

*FIG. 2C*

Step 240 – Separate the color sub-pixels of each delta layer image into a respective color data stream.

*FIG. 2D*

Step 250 – Compress the alpha and color data streams of each delta layer image to produce respective compressed images.

LAYERED IMAGE COMPRESSION

FIELD OF INVENTION

The embodiments described herein set forth techniques for compressing layered images for distribution to destination computing devices. In particular, the techniques involve pre-processing the layered images in a manner that can enhance resulting compression ratios when the layered images are compressed (e.g., using Lempel-Ziv-Welch (LZW)-based compressors) prior to distribution to destination computing devices.

BACKGROUND

Well-designed graphical user interfaces (GUIs) play a critical role in effectively engaging users and providing pleasant interaction experiences with computing devices. As a result, efforts continue to be made to enhance GUIs over time in correlation with the general advancements being achieved in computing power and network bandwidth capabilities. For example, the resolutions of GUI elements presented in GUIs have expanded over time to coincide with the advancements that are being made to display devices with successive hardware releases. Moreover, the overall richness/complexity of GUI elements continues to evolve in attempt to provide a more natural feel to users as they interact with computing devices through the GUIs.

One example of such an advancement includes rich GUI elements that exhibit a "parallax" effect. In particular, a parallax-capable GUI element can enable a user to articulate a viewing angle of the parallax-capable GUI element a manner similar to interacting with a physical object in the real world. According to some approaches, a layered image can be used as a basis to form a parallax-capable GUI element, where the layered image defines a pre-defined ordering in which the different images of the layered image are logically stacked over one another. In this manner, when the parallax-capable GUI element is articulated (e.g., through a user input), the overall rate of movement of each image coincides with its logical ordering within the stack. For example, the amount of movement can increase in an ascending fashion with the logical orderings to achieve the parallax effect, where each image in the stack moves at a higher rate than a respective image that is logically disposed lower in the stack.

Notably, while such parallax-capable GUI elements can provide a pleasant user experience, several implementation challenges continue to persist that have yet to be addressed. Consider, for example, a scenario in which a layered image for a parallax-capable GUI element is delivered over a network connection (e.g., from a source computing device to a destination computing device that displays the parallax-capable GUI element). In this scenario, to effectively display a parallax-capable GUI element, each of the different images of which the layered image is composed must first be transmitted to the destination computing device, which consumes a considerable amount of processing and network resources. As a result, GUI lag can occur at the destination computing device and result in a situation where a user is waiting for the parallax-capable GUI element to load, thereby rendering the intended benefits of the GUI enhancements irrelevant. Moreover, this problem is exacerbated as GUI resolutions increase over time, where additional computing power and network bandwidth is required to transmit enhanced layered images.

Accordingly, what is needed is a technique for delivering layered images between computing devices in an efficient manner so that transmission bottlenecks do not introduce GUI rendering delays that are frustrating to users.

SUMMARY OF INVENTION

Accordingly, representative embodiments set forth herein disclose techniques for compressing layered images for distribution to destination computing devices. In particular, the techniques involve pre-processing the layered images in a manner that can enhance resulting compression ratios when the layered images are compressed (e.g., using Lempel-Ziv-Welch (LZW)-based compressors) prior to distribution to destination computing devices.

One embodiment sets forth a method for compressing images for distribution to a destination computing device, where the method is implemented by a source computing device with which the destination computing device is configured to interface. According to some embodiments, the method can include the steps of (1) accessing at least two images of a layered image: (i) a background image, and (ii) one or more layer images, and (2) generating a flattened image (or accessing a previously-generated flattened image) composed from the at least two images. Next, the method can include the steps of (3) generating respective one or more delta layer images for the one or more layer images by: for at least one pixel of each layer image having (i) an alpha sub-pixel set to fully opaque, and (ii) a first color property equivalent to a second color property of a corresponding pixel within the flattened image: setting all bits of the first color property of the pixel to the same value (e.g., zero (0) or one (1)). Additionally, the method can include the steps of (4) compressing the one or more delta layer images to produce one or more compressed delta layer images, and (5) providing the one or more compressed delta layer images to the destination computing device. In this manner, improved compression ratios can be achieved through the elimination of extraneous pixel information within the layer images that can instead be obtained by way of the flattened image at the destination computing device.

Other embodiments include a non-transitory computer readable storage medium configured to store instructions that, when executed by a processor included in a computing device, cause the computing device to carry out the various steps of any of the foregoing methods. Further embodiments include a computing device that is configured to carry out the various steps of any of the foregoing methods.

Other aspects and advantages of the invention will become apparent from the following detailed description taken in conjunction with the accompanying drawings that illustrate, by way of example, the principles of the described embodiments.

BRIEF DESCRIPTION OF THE DRAWINGS

The disclosure will be readily understood by the following detailed description in conjunction with the accompanying drawings, wherein like reference numerals designate like structural elements.

DETAILED DESCRIPTION

Representative applications of methods and apparatus according to the present application are described in this section. These examples are being provided solely to add context and aid in the understanding of the described embodiments. It will thus be apparent to one skilled in the art that the described embodiments can be practiced without some or all of these specific details. In other instances, well-known process steps have not been described in detail in order to avoid unnecessarily obscuring the described embodiments. Other applications are possible, such that the following examples should not be taken as limiting.

In the following detailed description, references are made to the accompanying drawings, which form a part of the description and in which are shown, by way of illustration, specific embodiments in accordance with the described embodiments. Although these embodiments are described in sufficient detail to enable one skilled in the art to practice the described embodiments, it is understood that these examples are not limiting such that other embodiments can be used, and changes can be made without departing from the spirit and scope of the described embodiments.

Representative embodiments set forth herein disclose techniques for compressing layered images for distribution to destination computing devices. In particular, the techniques involve pre-processing the layered images in a manner that can enhance resulting compression ratios when the layered images are compressed (e.g., using Lempel-Ziv-Welch (LZW)-based compressors) prior to distribution to destination computing devices.

As previously noted herein, layered images can be used as a basis to form parallax-capable graphical user interface (GUI) elements for display on destination computing devices. According to some embodiments, a layered image can include (i) a background image, and (ii) one or more layer images that are logically disposed over the background image according to a pre-defined ordering. For example, a designer can form a layered image where the background image depicts a landscape, a first layer image depicts a water tower (in front of the landscape), and a second layer image depicts an individual (in front of the landscape/water tower). As a brief aside, it is noted that each layer image typically includes an alpha channel to enable individual pixels of the layer image to be wholly transparent, partially transparent, or not transparent (i.e., fully opaque). In this manner, colors of the pixels of a given layer image can be influenced by underlying images in accordance with transparency dynamics. Returning now to the foregoing example, when a parallax-capable GUI element (formed using the layered image) is articulated (e.g., through a user input), the landscape will mostly remain fixed, the water tower will move relative to the landscape at particular rate, and the individual will move relative to the water tower at a higher rate, thereby achieving the parallax effect described herein.

Importantly, while such parallax effects can be pleasing to users, it can be challenging to deliver layered images to destination computing devices (to form parallax-capable GUI elements) in an efficient manner. For example, when a layered image is transmitted to a destination computing device, transmission is required for each of (i) the background image, and (ii) the one or more layer images (of which the layered is composed), which requires substantial processing and network bandwidth in comparison to legacy approaches (e.g., transmitting a single image for display via a basic GUI element). Moreover, this problem is exacerbated as GUI resolutions increase over time (e.g., 1080 P to 4K resolutions) and increase the overall file sizes of the various images included in the layered image. Therefore, it is desirable to implement a technique by which layered images are delivered to destination computing devices in an efficient manner.

To achieve this goal, the embodiments set forth herein set forth a technique for pre-processing layered images prior to compression to improve their overall compression ratio. According to some embodiments, a first step can involve fusing the content of the layered image—i.e., (i) a background image, and (ii) one or more layer images that are logically disposed over the background image—into a flattened image using well-known techniques. As described in greater detail herein, this single, flattened image can first be transmitted to a destination computing device to achieve a responsive GUI at the destination computing device. For example, the destination computing device can generate a basic GUI element that immediately displays the flattened image, thereby providing a fluid and responsive GUI at the destination computing device.

Importantly, and as described in greater detail herein, this flattened image can also be used as a basis to remove—and subsequently reconstruct—redundant pixels included in the various layer images of which the layered image is composed. To achieve this benefit, a second step can involve generating respective one or more delta layer images for the one or more layer images by: for at least one pixel of each layer image having (i) an alpha sub-pixel set to fully opaque, and (ii) a first color property equivalent to a second color property of a corresponding pixel within the flattened image: setting all bits of the first color property of the pixel to the same value (e.g., zero (0) or one (1)). Additionally, this second step can also be carried out on the background image to produce an additional delta layer image, and can involve establishing an alpha channel for the background image if one does not already exist.

Accordingly, each delta layer image, when logically disposed over the flattened image, will continue to look the same because the pixels modified by the second step described above (i.e., set with all bits at the same value) will take on the color values of the corresponding pixels in the flattened image. In this manner, the aforementioned delta layer images can be compressed and then transmitted to the destination computing device, and decompressed/reconstructed to their original state (because the destination computing device has already received the flattened image, as described above). In particular, the destination computing device can logically dispose the delta layer images over the flattened image to effectively restore the modified pixels to their original color. In turn, the destination computing device can utilize the restored (1) background image, and (2) one or more layer images, and convert the basic GUI element (formed using the flattened image) into a parallax-capable GUI element using the restored images.

Additionally, is noted that while the various techniques described herein involve processing each layer image of a layered image—as well as each pixel included in each layer image—the embodiments set forth herein do not require this approach. On the contrary, the techniques described herein can be applied to any subset of layer images included in a layered image, as well as any subset of pixels included in the layer images, without departing from the scope of this disclosure.

Accordingly, the techniques set forth herein enable layered images to be pre-processed prior to compression to improve their overall compression ratio. A more detailed description of these techniques will now be provided below in conjunction with FIGS. 1, 2A-2E, and 3-4.

Figure 1:
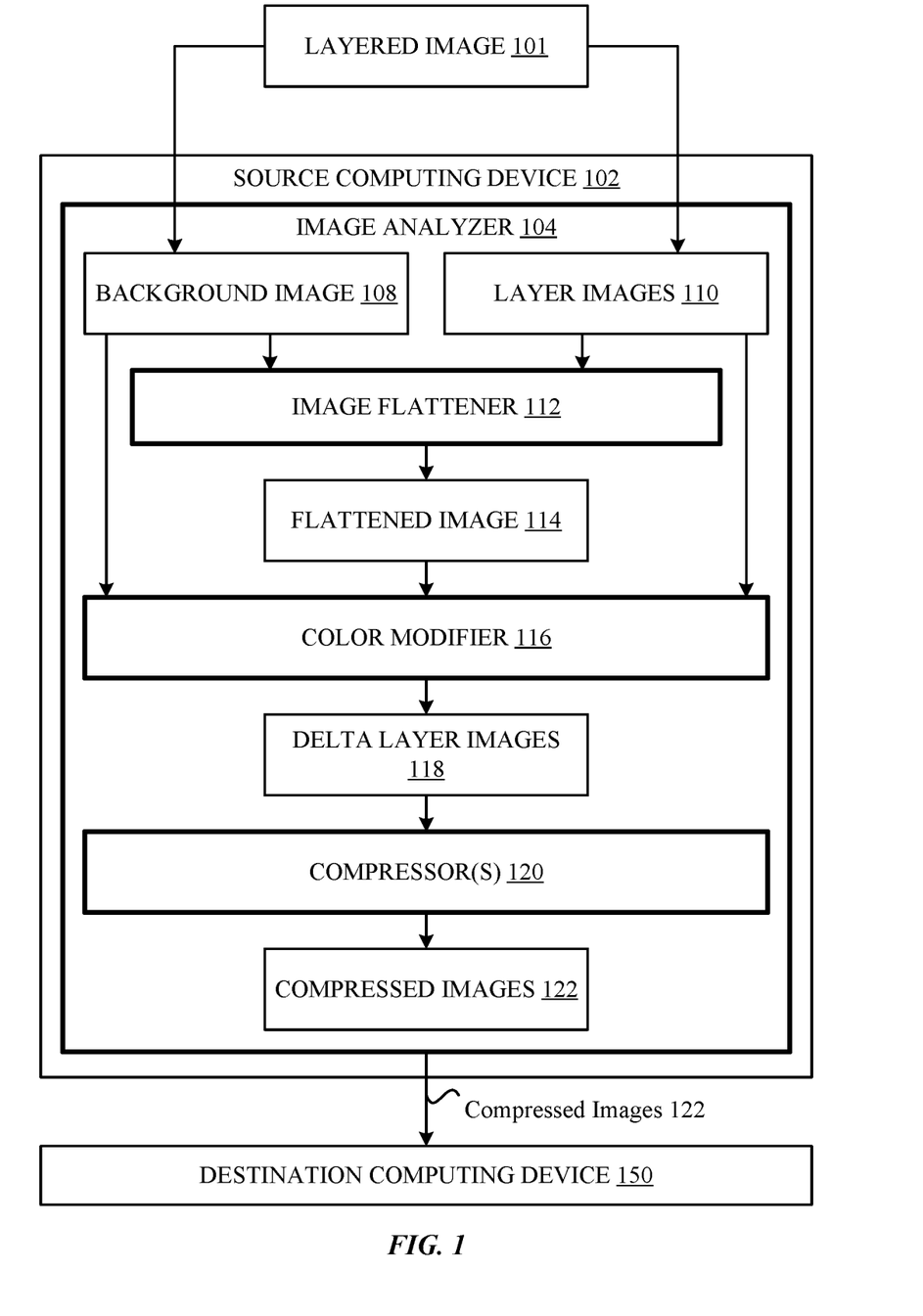
FIG. 1 illustrates an overview of a computing device that can be configured to perform the various techniques described herein, according to some embodiments.
Figure 4:
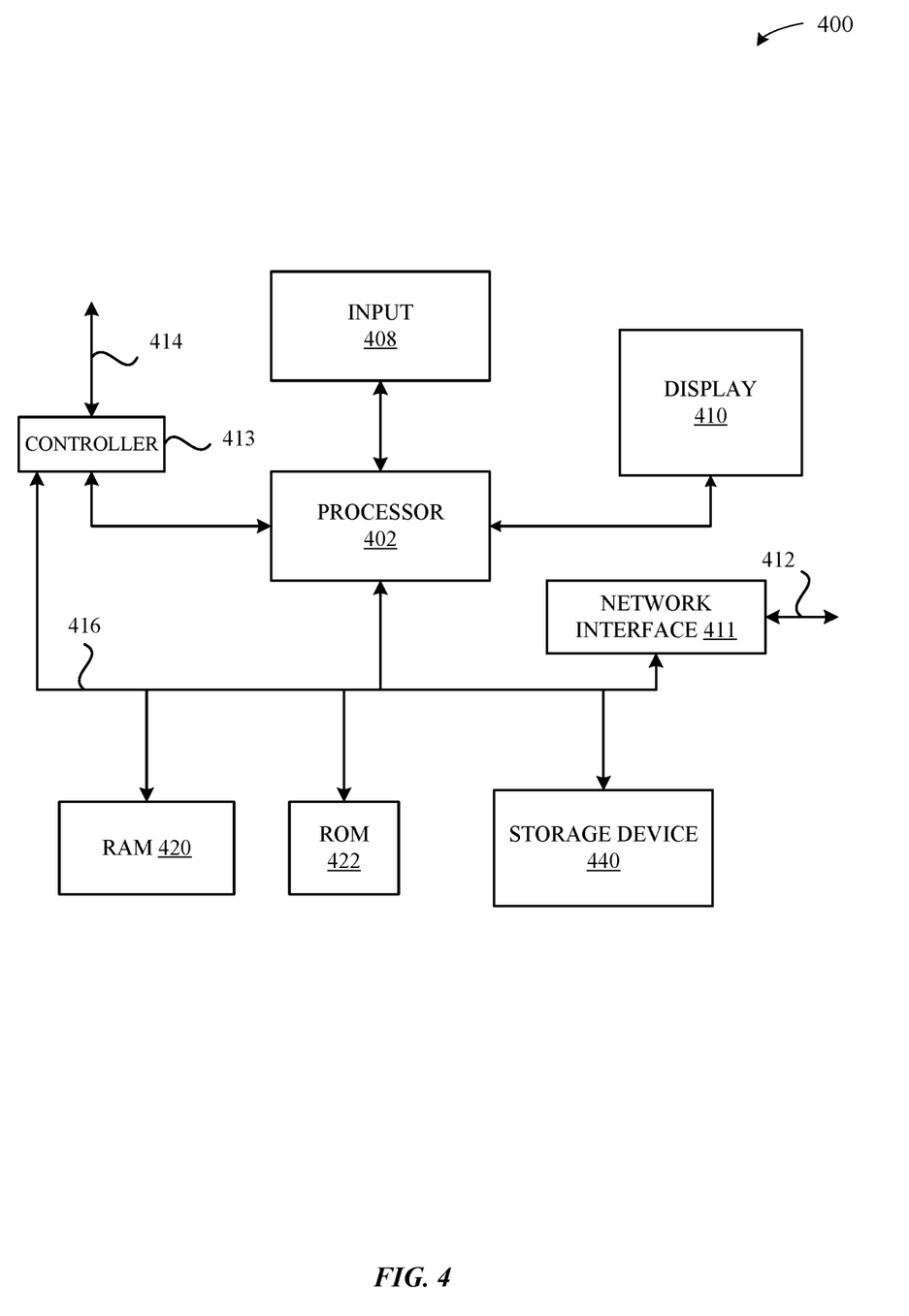
FIG. 4 illustrates a detailed view of a computing device that can be used to implement the various techniques described herein, according to some embodiments.

FIG. 1 illustrates an overview 100 of a source computing device 102 that can be configured to perform the various techniques described herein. It is noted that a more detailed breakdown of example hardware components that can be included in the source computing device 102 is illustrated in FIG. 4, and that these components are omitted from the illustration of FIG. 1 merely for simplification purposes. According to some embodiments, an operating system (OS) (not illustrated in FIG. 1) can be loaded at the source computing device 102, where the OS can execute a variety of applications that collectively enable the various techniques described herein to be implemented. For example, these applications can include an image analyzer 104 (and its internal components), which can be configured preprocess (i.e., prior to compressing) layered images 101 that include (1) at least one background image 108, and (2) one or more layer images 110.

According to some embodiments, the images described herein—e.g., the background images 108/layer images 110—can represent any form of multiple-channel images. For example, although the techniques set forth in this disclosure are described through examples that involve red, green, blue, and alpha (RGBA) images, the same techniques can apply to portable network graphics (PNG) images, bitmap images, tagged image file format (TIFF) images, and so on. It is noted that the techniques described herein can be applied to multiple-channel images having different resolutions, layouts, bit-depths, and so on (compared to those described herein) without departing from the scope of this disclosure. It is additionally noted that FIGS. 2A-2E and 3 (and the corresponding descriptions set forth below) provide a more detailed breakdown of the functionality of the image analyzer 104, and that the following description of the image analyzer 104 with respect to FIG. 1 is provided at a high level for simplification purposes.

As shown in FIG. 1, the image analyzer 104 can be configured to receive (1) a background image 108, and (2) one or more layer images 110. For example, the image analyzer 104 can receive a layered image 101 and split the layered image 101 into (1) the background image 108, and (2) the one or more layer images 110 based on properties associated with the layer image 110. For example, the properties can indicate a number of images that are stacked in the layered image 101, their logical ordering within the stack, their locations relative to one another, and so on. According to some embodiments, and as described in greater detail herein, each image can be composed of a collection of pixels, where each pixel in the collection of pixels includes a group of sub-pixels (e.g., for RGBA images: a red sub-pixel, a green sub-pixel, a blue sub-pixel, and an alpha sub-pixel). It is noted that the term "sub-pixel" used herein can be synonymous with the term "channel." As described in greater detail herein, the red-sub pixel, green sub-pixel, and blue sub-pixel of a given pixel can collectively define a color property associated with the pixel. Moreover, the alpha sub-pixel of the pixel can define whether the pixel is wholly transparent, partially transparent, or not transparent (i.e., fully opaque).

As shown in FIG. 1, when the image analyzer 104 receives the layered image 101, the image analyzer 104 provides (1) the background image 108, and (2) the one or more layer images 110, to an image flattener 112. In turn, the image flattener 112 fuses the background image 108 and the one or more layer images 110 into a flattened image 114 (e.g., using well-known techniques). As described in greater detail herein, this single, flattened image 114 can first be transmitted to a destination computing device 150 to achieve a responsive GUI at the destination computing device 150. Additionally, a color modifier 116 can be configured to receive (1) the flattened image 114, and (2) the background image 108 and the one or more layer images 110 (on which the flattened image 114 is based). In turn, the color modifier 116 can utilize the flattened image 114 as a basis for establishing respective delta layer images 118 for each of the background image 108 and the one or more layer images 110, which is described below in greater detail in conjunction with FIG. 2B.

Next, the color modifier 116 can provide the delta layer images 118 to one or more compressors 120. According to some embodiments, the compressor(s) 120 can be configured to implement one or more compression techniques for compressing the delta layer images 118. For example, the compressors 120 can implement Lempel-Ziv-Welch (LZW)-based compressors, other types of compressors, combinations of compressors, and so on. Moreover, the compressor(s) 120 can be implemented in any manner to establish an environment that is most-efficient for compressing the delta layer images 118. For example, multiple buffers can be instantiated (where pixels of the delta layer images 118 can be processed in parallel), and each buffer can be tied to a respective compressor 120 such that the content of the buffers can be simultaneously compressed in parallel as well. Moreover, the same or a different type of compressor 120 can be tied to each of the buffer(s) based on the formatting of the content that is placed into the buffer(s).

In any case, upon receipt of the delta layer images 118, the compressor(s) 120 can take action and compress the delta layer images 118 according to techniques described below in greater detail in conjunction with FIGS. 2C-2E. Finally, the output(s) of the compressor(s) 120 be transmitted to a destination computing device 150 as compressed images 122, which is described below in greater detail in conjunction with FIG. 2E.

Accordingly, FIG. 1 provides a high-level overview of different hardware/software architectures that can be implemented by source computing device 102 in order to carry out the various techniques described herein. A more detailed breakdown of these techniques will now be provided below in conjunction with FIGS. 2A-2E and 3-4.

Figure 2A:
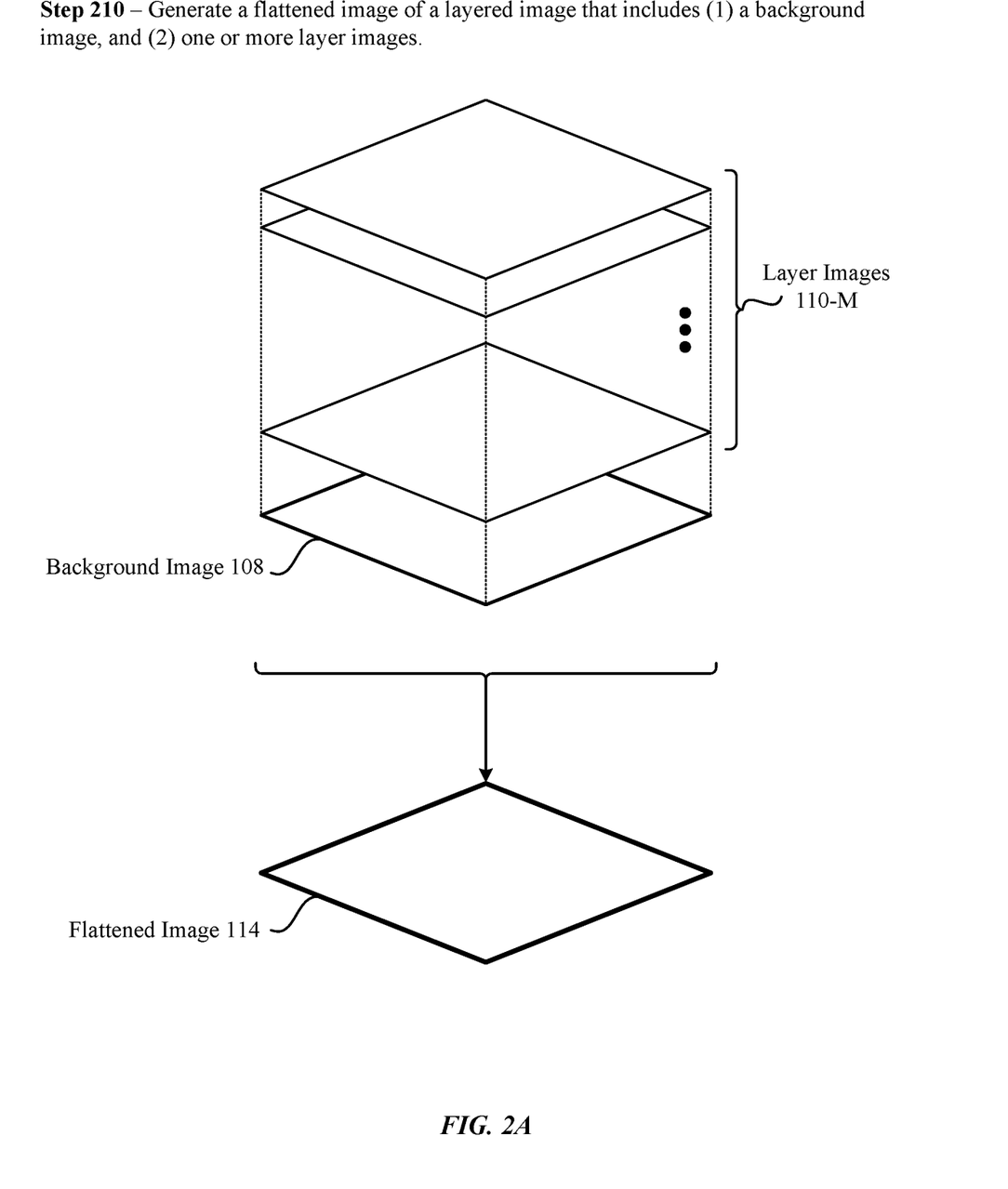
FIGS. 2A-2E illustrate a sequence of conceptual diagrams for compressing images for distribution to a destination computing device, according to some embodiments.
Figure 2B:
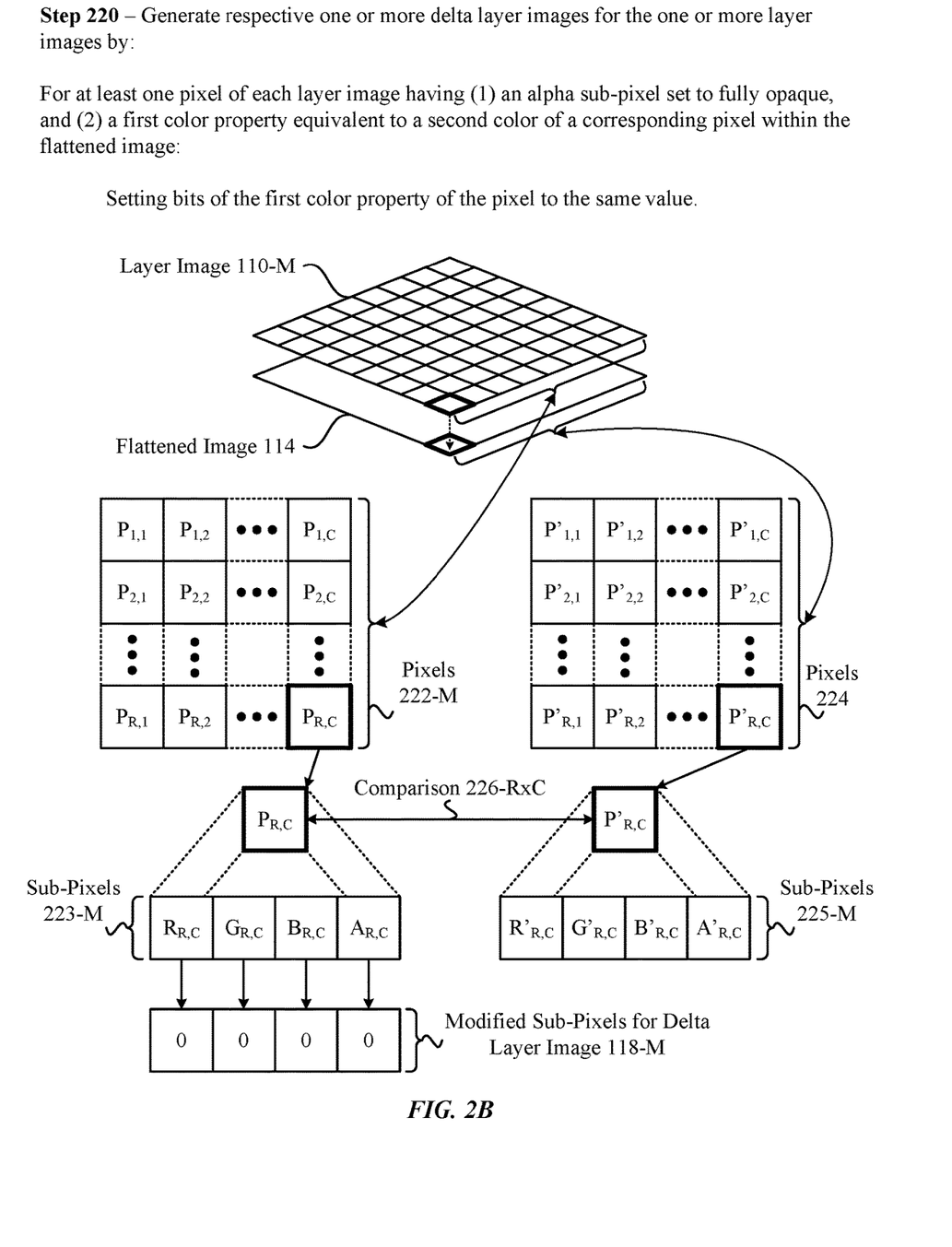
Figure 2C:
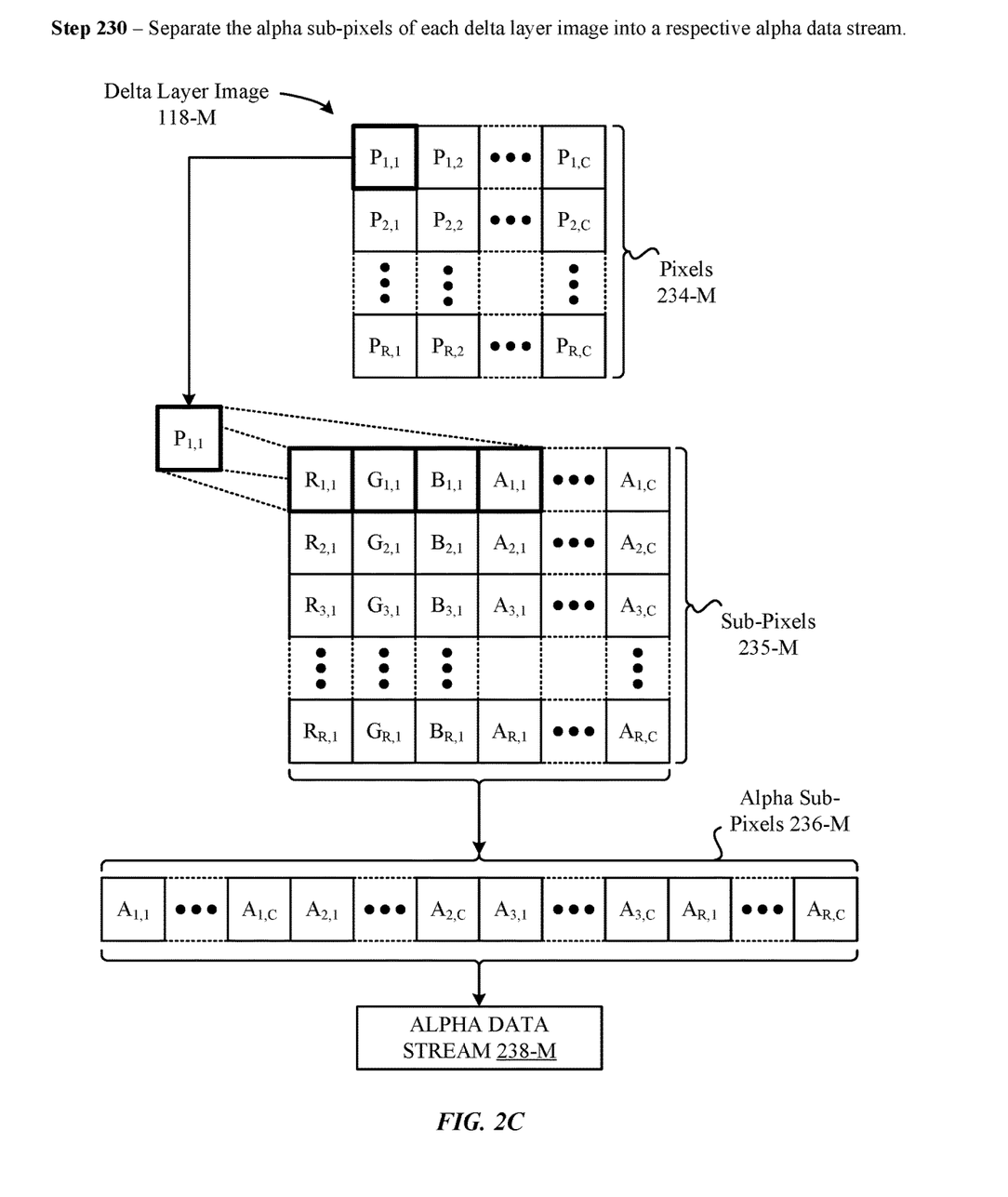

FIGS. 2A-2E illustrate a sequence of conceptual diagrams for pre-processing a layered image 101 for compression, according to some embodiments. In particular, the conceptual diagrams illustrate a series of steps that the image analyzer 104 (and its various sub-components) can be configured to carry out when pre-processing the layered image 101 for eventual compression by the compressor(s) 120. As shown in FIG. 2A, a first step 210 can involve generating a flattened image 114 based on the layered image 101, which includes (1) a background image 108, and (2) one or more layer images 110. According to some embodiments, the image flattener 112 fuses the background image 108 and the one or more layer images 110 into the flattened image 114 using well-known techniques. For example, the image flattener 112 can carry out a flattening operation based on information about different logical orderings/positions of each layer image 110 relative to one another and the background image 108 to properly fuse them into a single, flattened image 114. According to some embodiments, this information can be embedded (e.g., stored as properties) in the layered image 101, the background image 108, and/or the one or more layer images 110.

At the conclusion of step 210, the image analyzer 104 is in possession of the flattened image 114, which can then be used to perform a variety of useful functions. For example, the flattened image 114 can initially be transmitted to the destination computing device 150 when the destination computing device 150 issues a request for the layered image 101. In this manner, the flattened image 114 can be efficiently transmitted to the destination computing device 150 to serve as an initial basis for forming a basic GUI element. According to some embodiments, the flattened image 114 can be compressed prior to transfer to further enhance the overall efficiency of the transfer between the source computing device 102 and the destination computing device 150. In any case, after the flattened image 114 is transferred, the remainder of the layered image 101—which will be compressed according to the techniques described below in greater detail—can be transmitted to the destination computing device 150 to provide more enhanced GUI functionalities (e.g., parallax effects) using the additional content of the layered image 101.

Turning now to FIG. 2B, a second step 220 illustrates an approach that can be used to compress the various images included in the layered image 101, according to some embodiments. In particular, step 220 can involve the image analyzer 104—specifically, the color modifier 116—generating respective one or more delta layer images 118 for the one or more layer images 110. As shown in FIG. 2B, a given layer image 110 can include a collection of pixels 222, where each pixel is denoted as "P". As also shown in FIG. 2B, the pixels 222 can be arranged according to a row/column layout, where the subscript of each pixel 222 "P" (e.g., "1,1") indicates the location of the pixel 222 in accordance with the rows and columns. In the example illustrated in FIG. 2B, the pixels 222 of the layer image 110 are arranged in an equal number of rows and columns, such that the layer image 110 is a square image. However, it is noted that the techniques described herein can be applied to layer images 110 having different layouts (e.g., disproportionate row/column counts).

In any case, as shown in FIG. 2B, each pixel 222 is composed of four sub-pixels 223—a red sub-pixel 223 (denoted "R"), a green sub-pixel 223 (denoted "G"), a blue sub-pixel (denoted "B") 223, and an alpha sub-pixel 223 (denoted "A"). According to some embodiments, the red sub-pixel 223, the green sub-pixel 223, and the blue sub-pixel 223 of a given pixel 222 can collectively define a color property for the pixel 222, as is well-understood. Additionally, the alpha sub-pixel 223 of a given pixel 222 can take on different values to define whether the pixel 222 is wholly transparent, partially transparent, or not transparent (i.e., fully opaque). For example, when an alpha sub-pixel 223 of a given pixel 222 has a bit-depth of eight (8) bits, two-hundred a fifty-six (256) different values can be assigned to the alpha sub-pixel 223 to establish a level of transparency at which the pixel 222 should be rendered.

Notably, the techniques described herein involve, for each layer image 110, exploiting candidate pixels 222 within the layer image 110 that are (1) fully-opaque, and (2) share the same color property as underlying pixels 224 in the flattened image 114, as these pixels 222 can be restored at a later time in a lossless manner. More specifically, the candidate pixels 222 can be cleared of their information to indicate that the information can be recovered by way of the flattened image 114. Using this approach, the overall file sizes of the layer images 110 can be reduced by way of the cleared information, thereby improving efficiency. In turn, the destination computing device 150—which, by way of the techniques described herein, is in possession of the flattened image 114 prior to receiving the layer images 110—can utilize the flattened image 114 to restore the layer images 110 to their original state as they are received.

To carry out the foregoing techniques, the color modifier 116 can logically dispose each layer image 110 (e.g., individually/one at a time) over the flattened image 114, and process each pixel 222 within the layer image 110 to identify whether the pixel 222 is a candidate for modification. According to some embodiments, the color modifier 116 can be configured to reference location data associated with a given layer image 110 to identify how the layer image 110 should be disposed relative to the flattened image 114. To carry out the modifications described herein, the color modifier 116 can first identify pixels 222 that are fully opaque, which is a primary requirement to be eligible for modification. In particular, wholly or semi-transparent pixels 222, if modified, would likely result in unintended defects during rendering—especially when implementing the parallax-based effects described herein, which will cause the color properties of such pixels 222 to change during the parallax-based motions. In contrast, fully-opaque pixels 222 have unchanging color properties (as they are not influenced by underlying pixels due to transparency), so they can simply be cleared of their data when their color properties match the color properties of their underlying/corresponding pixels 224.

Accordingly, the color modifier 116 can, for at least one pixel 222 (of a given layer image 110) that is identified as fully-opaque, identify—through a comparison 226—whether a first color property of the pixel 222 is equivalent to a second color property of the corresponding pixel 224 (in the flattened image 114). For example, for a given pixel 222, the color modifier 116 can compare (1) the red sub-pixel 223 to a red sub-pixel 225 of a corresponding pixel 224, (2) the green sub-pixel 223 to a green sub-pixel 225 of the corresponding pixel 224, and (3) the blue sub-pixel 223 to a blue sub-pixel 225 of the corresponding pixel 224 to effectively identify whether the first and second color properties match. In turn, when the first and second color properties match, the color modifier 116 can set bits of the first color property of the pixel 222 to the same value (e.g., setting bits of all of the red, green, and blue sub-pixels 223 to zero (0) or one (1)), thereby establishing modified sub-pixels 223. Accordingly, the color modifier 116 effectively clears each qualifying pixel 222 in a manner that (1) reduces/streamlines the amount of data associated with the pixel 222, and (2) flags the pixel 222 as one that has been modified and requires restoration. Additionally, it is noted that by clearing the data of the qualifying pixels 222, the overall entropy of the layer image 110 can substantially be reduced, especially when there is a high amount of matching overlap between the layer image 110 and the flattened image 114. As a result, the reduced entropy can contribute to higher compression ratios, thereby enhancing performance.

It is noted that the modifications to the layer images 110 described herein can be performed "in-place," where each layer image 110 is ultimately converted into a delta layer image 118. Alternatively, blank (e.g., zero-filled) delta layer images 118 can first be established, and then populated with data from the layer images 110 as they are processed.

Additionally, the delta layer images 118 can be flagged with information (e.g., using metadata) to indicate that at least some form of modification was made, thereby enabling destination computing devices 150 to effectively identify when a restoration procedure (e.g., the inverse of step 220) should be carried out. In any case, at the conclusion of step 220, a respective delta layer image 118 exists for each of the layer images 110 included in the layered image 101. Again, it is noted that is not a requirement to process all of the layer images 110 included in the layered image 101, and that the techniques set forth herein can instead be applied against any subset of layer images 110.

Additionally, although not illustrated in step 220, the color modifier 116 can be configured to carry out the same technique against the background image 108. In some cases, the background image 108 does not include an alpha channel, as the background image 108 is meant to serve as a foundational image (where transparency is irrelevant). However, there is additional opportunity for enhancement given that (1) the flattened image 114 is formed using the background image 108, and (2) the background image 108 will be transmitted to the destination computing device 150 (where efficiency enhancements can be achieved if the background image 108 is reduced in size). Accordingly, if an alpha channel is not included in the background image 108, the color modifier 116 can add the alpha channel to the background image 108, e.g., by adding alpha sub-pixels 223 to each pixel 222 in the background image 108. In turn, the color modifier 116 can process the background image 108 in the same manner as described above with the layer images 110. In this manner, the overall size/entropy of the background image 108 can be reduced, thereby further increasing efficiency.

Accordingly, at the conclusion of step 220, respective delta layer images 118 have been established for the background image 108 and the one or more layer images 110. As noted above, these delta layer images 118 are in a pre-processed state for potentially improved compression ratios. Turning now to FIG. 2C, a third step 230 involves processing pixels 234 the delta layer images 118 to separate sub-pixels 235—specifically, alpha sub-pixels 236—into a respective alpha data stream 238. According to some embodiments, the alpha sub-pixels 236 can be extracted from the delta layer image 118 in any order, but preferably one that yields the lowest entropy (to improve compression ratios). For example, the alpha sub-pixels 236 can be extracted in a left to right (i.e., row-wise)/top down (i.e., column-wise) order, and placed into the alpha data stream 238. For example, as shown in FIG. 2C, the alpha sub-pixel 236 for the first pixel 234 "P(1,1)" can be extracted first, followed by the alpha sub-pixel 236 for the second pixel 234 "P(1,2)", and so on. It is noted that the alpha sub-pixels 236 can be extracted in any order from the pixels 234 (and placed into the alpha data stream 238) without departing from the scope of this disclosure. In any case, at a later time, the alpha data stream 238 can be grouped with a color data stream formed from the remaining sub-pixels 235 and provided to the compressor(s) 120, which is described below in greater detail in conjunction with FIGS. 2D-2E.

Figure 2D:
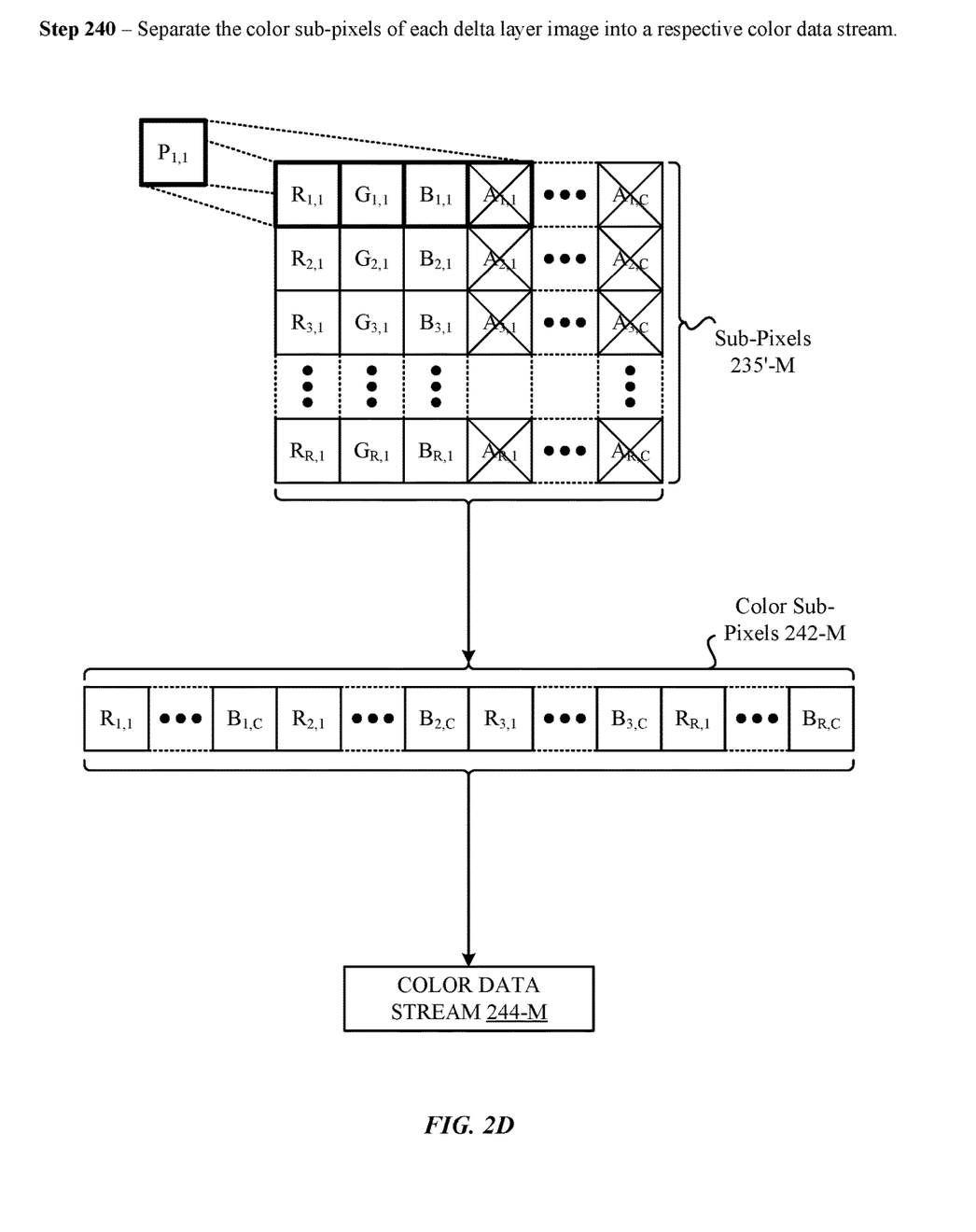

Turning now to FIG. 2D, a fourth step 240 involves processing pixels 234 for the delta layer images 118 to further separate the sub-pixels 235—which have transitioned into the sub-pixels 235' to represent the absence of alpha sub-pixels 236 (due to their removal and placement into the alpha data stream 238)—into a respective color data stream 244. Specifically, step 240 can involve, for a given delta layer image 118, extracting color sub-pixels 242 from the sub-pixels 235', and placing the color sub-pixels 242 into a respective color data stream 244. Again, the color sub-pixels 242 can be extracted from the delta layer image 118 in any order, but preferably one that yields the lowest entropy (to improve compression ratios). For example, the color sub-pixels 242 can be extracted in a left to right (i.e., row-wise)/top down (i.e., column-wise) order, and placed into the color data stream 244. It is noted that the color sub-pixels 242 can be extracted in any order from the sub-pixels 235' (and placed into the color data stream 244) without departing from the scope of this disclosure.

Figure 2E:
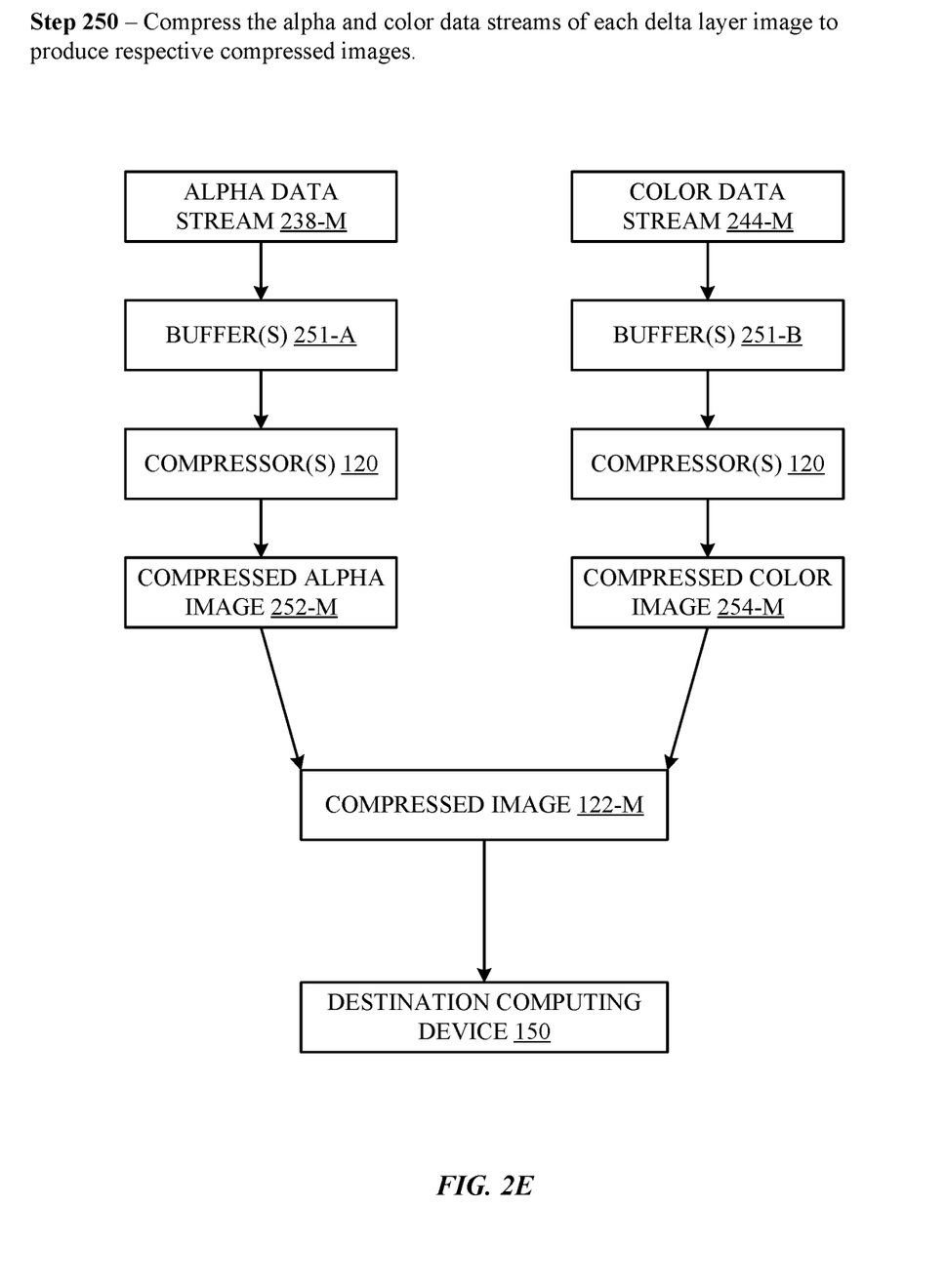

Turning now to FIG. 2E, two different data streams have been established for the delta layer images 118: the alpha data stream 238 and the color data stream 244. In turn, a fifth step 250 can involve, for the delta layer images 118, providing the respective alpha data stream 238 and color data stream 244 to compressors 120 (e.g., using buffers 251-A/B), whereupon the compressors 120 are invoked to compress the two data streams. Subsequently, the compressor(s) 120 can take action and compress the contents of the alpha data stream 238 and the color data stream 244 to produce (1) a compressed alpha image 252, and (2) a compressed color image 254, respectively. In turn, the compressed alpha image 252 and the compressed color image 254 can be combined into a single compressed image 122. At this juncture, the image analyzer 104 can perform a series of tests on the compressed image 122 to identify whether the compressed image 122 has a smallest file size relative to other compression approaches that are available. For example, the image analyzer 104 can compress the original background image 108/layer image 110 (from which the compressed image 122 is derived) without performing the pre-processing techniques described herein, and compare the file sizes to identify an optimal compression approach. In this manner, the optimal compression approach can be identified and used to produce compressed images 122, which can then be distributed to a destination computing device 150.

At this juncture, the source computing device 102 possesses different data sets that can be used to improve the overall efficiency of transmitting image content for rendering on destination computing devices 150. In particular, the source computing device 102 is in possession of (1) the flattened image 114, and (2) the compressed images 122 (which include the background image 108 and the one or more layer images 110 in their pre-processed/compressed form). In turn, when the source computing device 102 receives a request from a destination computing device 150 to provide a layered image 101, the source computing device 102 can first respond by providing the flattened image 114 to the destination computing device 150 (again, the flattened image 114 itself can be compressed using known techniques). In this manner, the destination computing device 150 can efficiently obtain and render the flattened image 114 (e.g., into a basic GUI element), while continuing a process for receiving the additional content for the layered image 101. In particular, the source computing device 102 can transmit each of the compressed images 122 to the destination computing device 150. For example, the source computing device 102 can begin by transmitting the compressed image 122 for the background image 108. In turn, the destination computing device 150 receives the compressed image 122 for the background image 108, and carries out an inverse of the technique described above at step 220/FIG. 2B to reconstruct the background image 108 to its original form. This can involve, for example, identifying each modified pixel within the compressed image 122, and restoring its original color property based on a corresponding pixel within the flattened image 114. Additionally, the compressed images 122 for the one or more layer images 110 can be provided to the destination computing device 150, which then carries out the same restoration procedure by comparing them against the flattened image 114. It is noted that the compressed images 122 can be transmitted in any order without departing from the scope of this disclosure. In any case, when the destination computing device 150 receives/restores the compressed images 122 into their original form (i.e., the background image 108 and the one or more layer image 110), the destination computing device 150 can convert the basic GUI element into an enhanced GUI element capable of exhibiting the parallax effect.

Additionally, it is noted that the image analyzer 104 can be configured to pre-process the layered image 101 using other approaches to identify additional optimizations that can be afforded with respect to compressing the layered image 101. For example, the image analyzer 104 can be configured to take advantage of any symmetry that is identified within the background image 108/one or more layer images 110. For example, the image analyzer 104 can be configured to (1) identify vertical symmetry, horizontal symmetry, diagonal symmetry, etc., within a layer image 110, (2) carve out the redundant pixels 222, and (3) process the remaining pixels 222. For example, when a layer image 110 is both vertically and horizontally symmetric, the image analyzer 104 can process only a single quadrant of the layer image 110 to increase efficiency. In another example, when the layer image 110 is diagonally symmetrical, the image analyzer 104 can process only a single triangular portion of the layer image 110 to increase efficiency. In any case, when these efficiency measures are invoked, the image analyzer 104 can be configured to embed information (e.g., within the layer image 110) about the symmetry so that the disregarded portions can be re-established when the compressed image 122 (of the layer image 110) is decompressed/rebuilt at the destination computing device 150.

Figure 3:
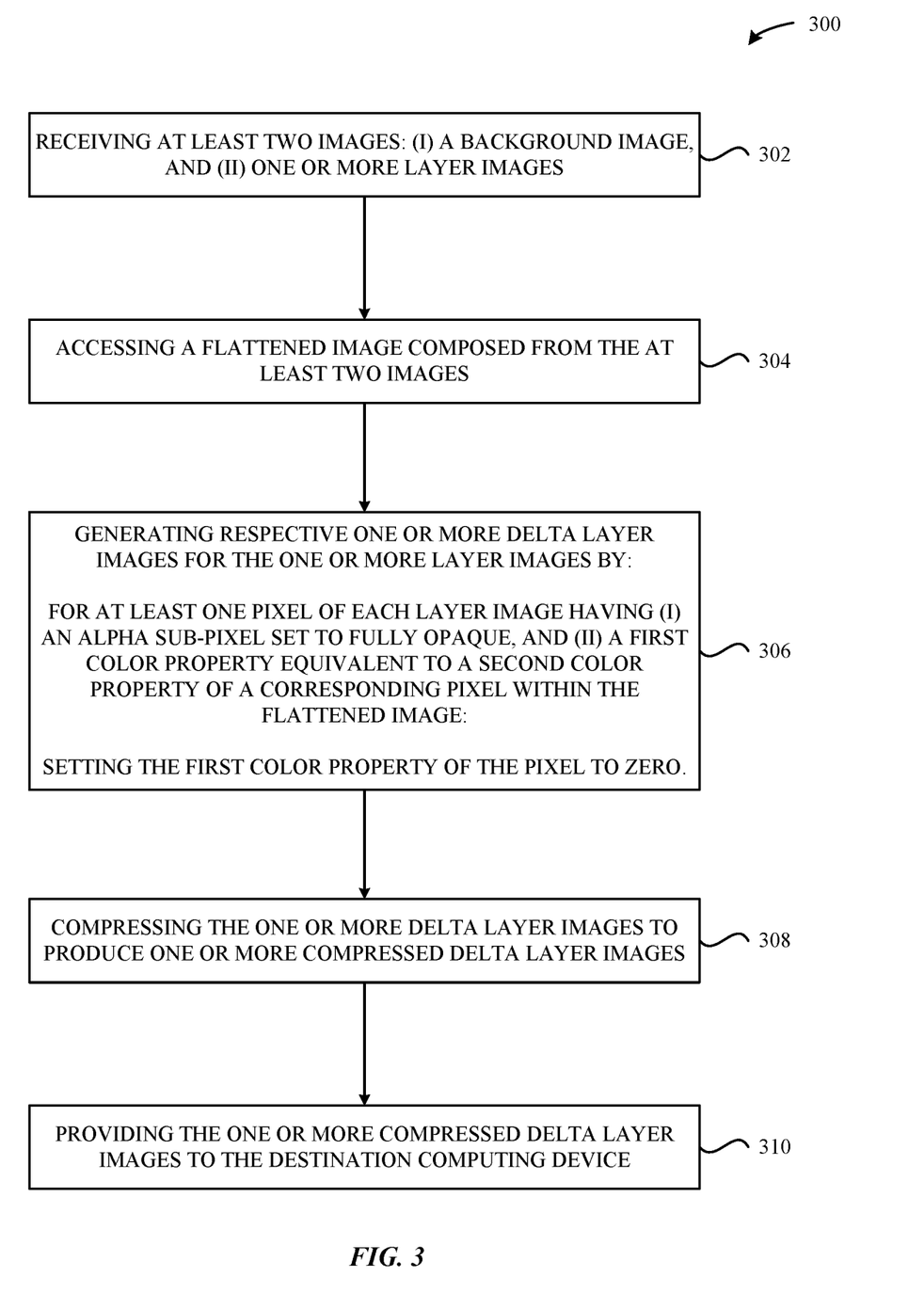
FIG. 3 illustrates a method for compressing images for distribution to a destination computing device, according to some embodiments.

FIG. 3 illustrates a method 300 for compressing images for distribution to a destination computing device, according to some embodiments. As shown in FIG. 3, the method 300 begins at step 302, where the image analyzer 104 receives at least two images: (i) a background image, and (ii) one or more layer images (e.g., as described above in conjunction with FIG. 2A). At step 304, the image analyzer 104 accesses a flattened image composed from the at least two images (e.g., as also described above in conjunction with FIG. 2A). At step 306, the image analyzer 104 generates respective one or more delta layer images for the one or more layer images by: for at least one pixel of each layer image having (i) an alpha sub-pixel set to fully opaque, and (ii) a first color property equivalent to a second color property of a corresponding pixel within the flattened image: setting all bits of the first color property of the pixel to the same value (e.g., zero (0) or one (1), as described above in conjunction with FIG. 2B). At step 308, the image analyzer 104 compresses the one or more delta layer images to produce one or more compressed delta layer images (e.g., as described above in conjunction with FIGS. 2C-2E). At step 310, the image analyzer 104 provides the one or more compressed delta layer images to the destination computing device (e.g., as described above in conjunction with FIG. 2E).

FIG. 4 illustrates a detailed view of a computing device 400 that can be used to implement the various techniques described herein, according to some embodiments. In particular, the detailed view illustrates various components that can be included in the source computing device 102 described in conjunction with FIG. 1. As shown in FIG. 4, the computing device 400 can include a processor 402 that represents a microprocessor or controller for controlling the overall operation of the computing device 400. The computing device 400 can also include a user input device 408 that allows a user of the computing device 400 to interact with the computing device 400. For example, the user input device 408 can take a variety of forms, such as a button, keypad, dial, touch screen, audio input interface, visual/image capture input interface, input in the form of sensor data, and so on. Still further, the computing device 400 can include a display 410 that can be controlled by the processor 402 (e.g., via a graphics component) to display information to the user. A data bus 416 can facilitate data transfer between at least a storage device 440, the processor 402, and a controller 413. The controller 413 can be used to interface with and control different equipment through an equipment control bus 414. The computing device 400 can also include a network/bus interface 411 that couples to a data link 412. In the case of a wireless connection, the network/bus interface 411 can include a wireless transceiver.

As noted above, the computing device 400 also includes the storage device 440, which can comprise a single disk or a collection of disks (e.g., hard drives). In some embodiments, storage device 440 can include flash memory, semiconductor (solid state) memory or the like. The computing device 400 can also include a Random-Access Memory (RAM) 420 and a Read-Only Memory (ROM) 422. The ROM 422 can store programs, utilities or processes to be executed in a non-volatile manner. The RAM 420 can provide volatile data storage, and stores instructions related to the operation of applications executing on the computing device 400, e.g., the image analyzer 104/compressor(s) 120.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for compressing images for distribution to a destination computing device, the method comprising, at a source computing device:

accessing at least two images of a layered image, wherein the at least two images include: (i) a background image, and (ii) two or more layer images;
generating a flattened image based on the at least two images;
for each layer image of the two or more layer images, generating respective two or more delta layer images by:
for each pixel of the layer image having (i) an alpha sub-pixel set to fully opaque, and (ii) a first color property that is equivalent to a second color property of a corresponding pixel within the flattened image:
setting bits of the first color property of the pixel to an equal value;
compressing the two or more delta layer images to produce two or more compressed delta layer images; and
providing the two or more compressed delta layer images to the destination computing device.

2. The method of claim 1, further comprising, prior to accessing the flattened image:
generating the flattened image based on a hierarchical ordering of the two or more layer images relative to the background image;
compressing the flattened image to produce a compressed flattened image; and
providing the compressed flattened image to the destination computing device.

3. The method of claim 2, further comprising, at the destination computing device:
receiving the compressed flattened image; and
causing the compressed flattened image to be displayed on a display device prior to receiving the two or more compressed delta layer images.

4. The method of claim 1, further comprising:
generating a delta background image by, for at least one pixel of the background image, performing the following steps when a third color property of the pixel is equivalent to a fourth color property of a corresponding pixel within the flattened image:
setting bits of the third color property of the pixel to a same value.

5. The method of claim 4, further comprising:
adding alpha sub-pixels to each pixel of the background image when the pixels of the background image do not include alpha sub-pixels.

6. The method of claim 1, wherein each layer image of the two or more layer images includes metadata that specifies (i) a location in which the layer image is disposed relative to the background image, and (ii) a logical ordering by which the layer image sits above the background image relative to any other layer images.

7. The method of claim 1, further comprising:
replacing at least one compressed delta layer image of the two or more compressed delta layer images with a respective second compressed delta layer image that is smaller in size than the at least one compressed delta layer image, wherein the second compressed delta layer image is based on a corresponding layer image.

8. The method of claim 1, further comprising:
flagging at least one compressed delta layer image of the two or more compressed delta layer images to indicate that the first color property for at least one pixel within the at least one compressed delta layer image was modified.

9. A non-transitory computer readable storage medium configured to store instructions that, when executed by a processor included in a source computing device, cause the source computing device to compress images for distribution to a destination computing device, by carrying out steps that include:
accessing at least two images of a layered image, wherein the at least two images include: (i) a background image, and (ii) two or more layer images;
generating a flattened image based on the at least two images;
for each layer image of the two or more layer images, generating respective two or more delta layer images by:
for each pixel of the layer image having (i) an alpha sub-pixel set to fully opaque, and (ii) a first color property that is equivalent to a second color property of a corresponding pixel within the flattened image:
setting bits of the first color property of the pixel to a same an equal value;
compressing the two or more delta layer images to produce two or more compressed delta layer images; and
providing the two or more compressed delta layer images to the destination computing device.

10. The non-transitory computer readable storage medium of claim 9, wherein the steps further include, prior to accessing the flattened image:
generating the flattened image based on a hierarchical ordering of the two or more layer images relative to the background image;
compressing the flattened image to produce a compressed flattened image; and
providing the compressed flattened image to the destination computing device.

11. The non-transitory computer readable storage medium of claim 10, wherein the steps further include, at the destination computing device:
receiving the compressed flattened image; and
causing the compressed flattened image to be displayed on a display device prior to receiving the two or more compressed delta layer images.

12. The non-transitory computer readable storage medium of claim 9, wherein the steps further include:
generating a delta background image by, for at least one pixel of the background image, performing the following steps when a third color property of the pixel is equivalent to a fourth color property of a corresponding pixel within the flattened image:
setting bits of the third color property of the pixel to a same value.

13. The non-transitory computer readable storage medium of claim 12, wherein the steps further include:
adding alpha sub-pixels to each pixel of the background image when the pixels of the background image do not include alpha sub-pixels.

14. The non-transitory computer readable storage medium of claim 9, wherein each layer image of the two or more layer images includes metadata that specifies (i) a location in which the layer image is disposed relative to the background image, and (ii) a logical ordering by which the layer image sits above the background image relative to any other layer images.

15. A source computing device configured to compress images for distribution to a destination computing device, the source computing device comprising:
at least one processor; and at least one memory storing instructions that, when executed by the at least one processor, cause the source computing device to carry out steps that include:

accessing at least two images of a layered image, wherein the at least two images include: (i) a background image, and (ii) two or more layer images;

generating a flattened image based on the at least two images;

for each layer image of the two or more layer images, generating respective two or more delta layer images by:

for each pixel of the layer image having (i) an alpha sub-pixel set to fully opaque, and (ii) a first color property that is equivalent to a second color property of a corresponding pixel within the flattened image:

setting bits of the first color property of the pixel to an equal value;

compressing the two or more delta layer images to produce two or more compressed delta layer images; and providing the two or more compressed delta layer images to the destination computing device.

16. The source computing device of claim 15, wherein the steps further include, prior to accessing the flattened image:

generating the flattened image based on a hierarchical ordering of the two or more layer images relative to the background image;

compressing the flattened image to produce a compressed flattened image; and providing the compressed flattened image to the destination computing device.

17. The source computing device of claim 16, wherein the steps further include, at the destination computing device:

receiving the compressed flattened image; and causing the compressed flattened image to be displayed on a display device prior to receiving the two or more compressed delta layer images.

18. The source computing device of claim 15, wherein the steps further include:

generating a delta background image by, for at least one pixel of the background image, performing the following steps when a third color property of the pixel is equivalent to a fourth color property of a corresponding pixel within the flattened image:

setting bits of the third color property of the pixel to a same value.

19. The source computing device of claim 18, wherein the steps further include:

adding alpha sub-pixels to each pixel of the background image when the pixels of the background image do not include alpha sub-pixels.

20. The source computing device of claim 15, wherein each layer image of the two or more layer images includes metadata that specifies (i) a location in which the layer image is disposed relative to the background image, and (ii) a logical ordering by which the layer image sits above the background image relative to any other layer images.

* * * * *

UNITED STATES PATENT AND TRADEMARK OFFICE
CERTIFICATE OF CORRECTION

PATENT NO. : 10,809,869 B2
APPLICATION NO. : 15/700113
DATED : October 20, 2020
INVENTOR(S) : Lindberg et al.

Page 1 of 1

It is certified that error appears in the above-identified patent and that said Letters Patent is hereby corrected as shown below:

In the Claims

In Claim 9, at Column 14, Lines 18-19: "the pixel to a same an equal value;" should read -- the pixel to an equal value; --.

Signed and Sealed this
Thirteenth Day of April, 2021

Drew Hirshfeld
*Performing the Functions and Duties of the*
*Under Secretary of Commerce for Intellectual Property and*
*Director of the United States Patent and Trademark Office*